United States Patent [19]

Akao

[11] Patent Number: 4,784,906
[45] Date of Patent: * Nov. 15, 1988

[54] PACKAGING MATERIAL FOR PHOTOSENSITIVE MATERIALS FOR PHOTOGRAPHIC PURPOSE

[75] Inventor: Mutsuo Akao, Kanagawa, Japan

[73] Assignee: Fuji Photo Film Co., Ltd., Kanagawa, Japan

[*] Notice: The portion of the term of this patent subsequent to Oct. 25, 2005 has been disclaimed.

[21] Appl. No.: 905,159

[22] Filed: Sep. 9, 1986

[30] Foreign Application Priority Data

Sep. 11, 1985 [JP] Japan .................. 60-138016[U]

[51] Int. Cl.⁴ .................. B32B 5/16; B65D 65/40
[52] U.S. Cl. .................. 428/324; 428/329;
428/330; 428/331; 428/408; 428/447;
428/424.8; 428/319.9; 428/317.6; 428/412;
428/513; 428/421; 428/516; 428/518; 428/520;
428/910; 428/913; 428/35; 428/349; 428/355;
206/455; 206/497; 264/176.1
[58] Field of Search .................. 428/408, 447, 324, 35,
428/329, 330, 331, 516, 520, 913; 430/538

[56] References Cited

U.S. PATENT DOCUMENTS

| | | |
|---|---|---|
| 4,147,291 | 4/1979 | Akao et al. . |
| 4,258,848 | 3/1981 | Akao et al. . |
| 4,331,725 | 5/1982 | Akao . |
| 4,337,285 | 6/1982 | Akao et al. . |
| 4,356,224 | 10/1982 | Akao et al. . |
| 4,359,499 | 11/1982 | Akao et al. . |
| 4,386,124 | 5/1983 | Akao . |
| 4,386,809 | 3/1984 | Akao et al. . |
| 4,411,943 | 10/1983 | Akao . |
| 4,411,945 | 10/1983 | Akao et al. . |
| 4,452,846 | 6/1984 | Akao . |
| 4,469,741 | 9/1984 | Akao . |
| 4,505,970 | 3/1985 | Crauer .................. 428/516 |
| 4,513,050 | 4/1985 | Akao . |
| 4,565,733 | 1/1986 | Akao . |
| 4,565,743 | 1/1986 | Akao .................. 428/522 |
| 4,576,865 | 3/1986 | Akao . |
| 4,579,781 | 4/1986 | Akao .................. 428/516 |
| 4,584,234 | 4/1986 | Hirose et al. .................. 428/516 |
| 4,587,175 | 5/1986 | Akao . |
| 4,590,124 | 5/1986 | Schoenberg .................. 428/516 |
| 4,629,640 | 12/1986 | Akao . |
| 4,639,386 | 1/1987 | Akao . |
| 4,653,640 | 3/1987 | Akao . |
| 4,661,395 | 4/1987 | Akao . |
| 4,661,401 | 4/1987 | Akao . |
| 4,663,218 | 5/1987 | Akao . |
| 4,687,692 | 8/1987 | Akao . |

Primary Examiner—P. C. Ives
Attorney, Agent, or Firm—Burns, Doane, Swecker & Mathis

[57] ABSTRACT

A packaging material for photographic photosensitive materials which comprises a simultaneously coextruded multilayer film layer comprising a light-absorptive light-shielding thermoplastic resin layer containing low-pressure linear low-density polyethylene resin, 0.1 to 15 wt. % of carbon black and 0.01 to 1 wt. % of a lubricant and being located as the inner layer and a light-reflective light-shielding thermoplastic resin layer being located as the outer layer.

This packaging material is superior in tear strength, impact puncture strength, Gelbo test strength, tensile strength, light-shielding, prevention of temperature elevation at the inside of package under sunlight, moistureproofness, heat resistance, discrimination of right side - reverse side under a safe light, slipping character, heat sealing properties and printability.

11 Claims, 3 Drawing Sheets

PACKAGING MATERIAL FOR PHOTOSENSITIVE MATERIALS FOR PHOTOGRAPHIC PURPOSE

BACKGROUND OF THE INVENTION

1. Field of the Invention

This invention relates to a packaging material for photosensitive materials for photographic purpose.

2. Description of Prior Art

Various types of packaging materials for photographic photosensitive materials have widely been put to practical use, and various properties are required according to their uses.

As the packaging materials for photographic photosensitive materials, it is necessary to have various properties such as light-shielding, gas barrier, moistureproofness, antistatic property, rigidity, physical strengths such as breaking strength, tear strength, impact puncture strength, Gelbo test strength and wear resistance, heat sealing properties such as heat seal strength, cut-seal ability, hot tack properties (hot-seal ability) and seal ability of contraries, flatness, slipping character and the like. The cut-seal ability is the suitability for fusing seal. In this sealing method, the hot plate for press is changed to a knife-shaped, and melting adhesion and cutting simultaneously occur.

Figure 17:
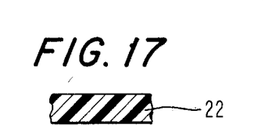
FIGS. 17 to 22 are sectional views of conventional packaging materials.
Figure 18:
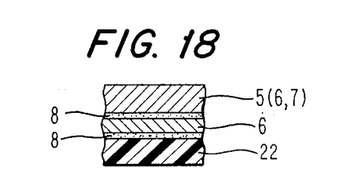
Figure 19:
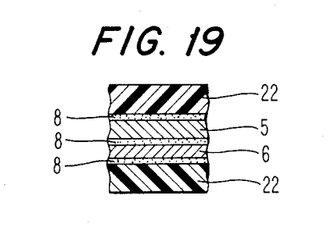
Figure 20:
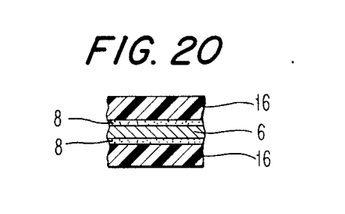
Figure 21:
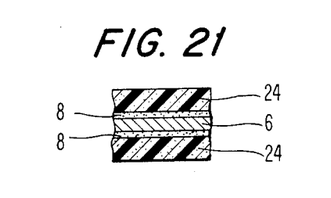
Figure 22:
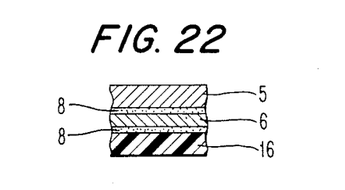

Generally, it is difficult to satisfy these properties by a single material. Therefore, a single layer film of a high-pressure low-density polyethylene (LDPE) kneaded with carbon black or a pigment, and a composite laminated film composed of a LDPE film and a flexible sheet such as paper, aluminum foil or cellophane, etc. have been employed. An example of the conventional packaging film is shown in FIG. 17. This film is the most fundamental single-layer packaging material consisting of a light-shielding LDPE film layer 22. Another example of the conventional packaging film is shown in FIG. 18. This film was used for packaging a product which particularly requires moistureproofness, and it is composed of a light-shielding LDPE film layer 22, a light-shielding metal foil layer 6 laminated on it through an adhesive layer 8, and a flexible sheet layer 5 laminated thereupon through an adhesive layer 8. Still another example of the conventional packaging film is shown in FIG. 19. This film was used as inner sheet of double-sheet gusset bag for packaging color photographic printing paper, and it is composed of a light-shielding LDPE film layer 22, a light-shielding metal foil layer 6, a flexible sheet layer 5, and a light-shielding LDPE film layer 22. They are laminated in that order, and an adhesive layer 8 is provided between each layers.

on the other hand, the present inventor has continued to investigate various packaging materials mainly for photographic photosensitive materials including the packaging materials of FIGS. 20–22. The packaging material of FIG. 20 consists of a metal foil layer 6 and two light-shielding L-LDPE film layers 16, 16 laminated on both sides of the metal foil layer each through an adhesive layer 8. The packaging material of FIG. 21 consists of a metal foil layer 6 and two light-shielding uniaxially stretched films 24, 24 laminated on both sides of the metal foil layer each through an adhesive layer 8. The molecular orientation axes of the stretched films are located so as to cross each other in order to raise physical strength. This packaging material is disclosed in U.S. Pat. No. 4,331,725. With respect to the packaging material containing a low-pressure linear low-density polyethylene (L-LDPE), a packaging material comprising at least one light-shielding film layer of polyethylene polymer of which more than 50 wt.% is L-LDPE and containing more than 1 wt.% of a light-shielding material has been disclosed (U.S. Pat. No. 4,452,846). The packaging material of FIG. 22 is the same as the packaging material of FIG. 18 except that a light-shielding L-LDPE film layer 16 is employed instead of the light-shielding LDPE film layer 22.

Physical properties of the conventional laminated films are not enough, and during packaging, the films were sometimes torn or punctured or were sometimes separated upon heat sealing of the films. In addition, when a large amount of a light-shielding material such as carbon black is added, physical strength as well as moistureproofness of the film is lowered. Then, the amount was set about 3 wt.%, and thickness of the film was more than 70 $\mu$m. As a result, the film was stiff, and working efficiency of the packaging process was adversely influenced. The cost of packaging was also expensive.

In the case of the laminated film disclosed in the specification of U.S. Pat. No. 4,331,725, heat sealing properties are not superior because of using uniaxially stretched high-density polyethylene film, and problems in sealing occasionally happened in packaging processes. In the case of cross-laminated films where two uniaxially stretched films were directly laminated so as to cross each other without laminating an aluminum foil, when a photosensitive material was packaged in a gusset bag, pinholes were appreciably formed at its gusset portion.

By employing L-LDPE resin for the packaging material, physical strength such as tear strength and Gelbo test strength is increased and the blending amount of a light-shielding material can be increased. However, when the thickness of the film was increased, moldability as well as appearance decreases, and moreover, the surface of the film becomes slippery.

Generally, since water absorbability of carbon black is large which can lead to inferior moistureproofness, the film blended with carbon black was made thicker, or an aluminum foil layer or a metallized film layer was further laminated.

In the case of the packaging material for photographic photosensitive materials, packaging operations are carried out under a safe light which does not adversely influence the photosensitive materials. Then, it is preferable that the right side and the reverse side of this packaging material can easily be discriminated under the safe light and that light-shielding and heat resistance can be secured by this packaging material without increasing the thickness.

Particularly, as the packaging materials for X-ray films for dental use, as the packaging materials for radiograph films for detecting radiation exposure of a person who treats radioactive materials (badge film) and as the packaging materials for vacuum packaging of the X-ray films described in Japanese Patent KOKOKU No. 55-24089, the development of simple films capable of satisfying all properties required as the above packaging materials has been desired.

SUMMARY OF THE INVENTION

It is an object of the invention to provide a packaging material for photographic photosensitive materials which is formed by thermoplastic resin layers alone and which is superior in light-shielding, gas barrier, moistureproofness, physical strength, heat sealing properties and moldability.

It is another object of the invention to provide a packaging material for photographic photosensitive materials of which the right side and the reverse side can easily be discriminated under safe light.

It is another object of the invention to provide a packaging material for photographic photosensitive materials which is superior in heat resistance, appearance and printability.

It is another object of the invention to provide a packaging material for photographic photosensitive materials which prevents temperature rise at the inside of package under sunlight.

it is another object of the invention to provide a packaging material for photograhic photosensitive materials which is suitable for X-ray films for dental use, for radiograph films for detecting radiation exposure and for other small pieces of photographic materials.

It is a further object of the invention to provide a packaging material for photographic photosensitive materials which is inexpensive.

Such objects can be achieved by the packaging material for photographic photosensitive materials which comprises a simultaneously coextruded multilayer film layer comprising a light-absorptive light-shielding thermoplastic resin layer containing L-LDPE resin, 0.1–15 wt.% of carbon black and 0.01–1 wt.% of a lubricant and being located as the inner layer and a light-reflective light-shielding thermoplastic resin layer being located as the outer layer.

BRIEF DESCRIPTION OF THE DRAWINGS

FIG. 2 is a sectional view thereof in a lateral direction.

DETAILED DESCRIPTION OF THE INVENTION

The light-absorptive light-shielding thermoplastic resin layer contains L-LDPE resin, carbon black and a lubricant.

L-LDPE is a copolymer of ethylene and $\alpha$-olefin, and it has a linear structure having short branches. The number of carbon atoms in the $\alpha$-olefin is 3–13, preferably 4–10, and examples are butene-1, 4-methylpentene-1, hexene-1, heptene-1 and octene-1. Preferable $\alpha$-olefins are 4-methylpentene-1, hexene-1 and ocetene-1. Suitable ethylene content if L-LDPE is 85–99.5 mol.%, i.e. $\alpha$-olefin content is 0.5–15 mol.%, and the preferable ethylene content is 90–99.5 mol.%, i.e. $\alpha$-olefin content is 0.5–10 mol.%. Suitable density is in the range of 0.87–0.95 g/cm$^3$, preferably 0.930–0.945 g/cm$^3$ (ASTM D-1505). Melt index (M.I., at 190° C.) is preferably 0.4–30 g/10 minutes (ASTM D-1238). Such a L-LDPE is manufactured by vapor phase or liquid phase low pressure methods. Examples of L-LDPE are "UNIPOLE" (trade name, UCC), "DOWLEX" (trade name, Dow Chemical Co., Ltd.), "STAMILEX" (trade name, DSM), "SUCLEAR" (trade name, Dupont de Nemour, Canada), "MARLEX" (trade name, Phillips Co., Ltd.), "ULTZEX" and "NEOZEX" (trade names, Mitsui Petroleum Chemical Industries Co., Ltd.), "NISSEKI LINIREX" (trade name, Nippon Petrochemicals Co., Ltd.), "IDEMITSU POLYETHYLENE-L" (Idemitsu Petrochemical Co., Ltd.) and "NUC POLYETHYLENE-LL" and "TUFLIN" (trade names, Nippon Unicar Co., Ltd.).

Carbon blacks are divided into gas black, oil furnace black, anthracene black, acetylene black, lamp black, vegetable black and animal black according to their origin. Among these, oil furnace carbon black is preferable in terms of light-shielding character, cost and improvement of properties. On the other hand, since acetylene black and Ketschen carbon black have antistatic character, they are also preferable, though they are expensive. They may be blended with the oil furnace black in order to improve its character. The suitable pH range of the carbon black is at 5 to 9, particularly 6 to 8, and the suitable mean particle size range is 10 to 120 m$\mu$. Oil furnace carbon black having pH 6 to 8 and mean particle size of 15 to 30 m$\mu$ is preferable. By using the carbon black of such pH and particle size, a packaging material having the following merits is obtained. That is, the occurrence of fogging is rare, increase or decrease of photosensitivity scarcely happens, light-shielding ability is large, and the lumps of carbon black and pinholes such as fish eyes are hardly generated.

As the method of blending carbon black with the resin, the powder blending method, the paste blending method, the wet blending method, the compound coloring method and the masterbatch method, etc. may be employed. Among them, the masterbatch method is preferable in points of cost and clear process. Various masterbatch methods are known, and any known method may be employed. Such a masterbatch method includes the method of dispersing carbon black into a polymer organic solvent solution to produce a masterbatch (Japanese Patent KOKOKU No. 40-26196) and the method of dispersing carbon black into polyethylene to produce a masterbatch (Japanese Patent KOKOKU No. 43-10362).

In this method, first, a masterbatch of LDPE is prepared by blending more than 2%, usually more than 10%, of carbon black with LDPE. Then, the L-LDPE is mixed with this masterbatch so that carbon black content becomes a prescribed value. Instead of LDPE, other polyolefin resins such as EEA and EVA or other thermoplastic resins capable of mixing with L-LDPE may also be employed.

L-LDPE resin film is superior to LDPE resin film in strength, but it is inferior in the difficulty of processing, the occurrence of blocking between films and its poor slipping character. Accordingly, it was considered that this film was not suitable for packaging. However, the present inventor has examined the influence of carbon black upon L-LDPE resin, and he has found that physical strength of the L-LDPE resin largely increases by blending carbon black contrary to the case of LDPE resin. That is, strength of LDPE resin is essentially weaker than L-LDPE resin, and it is remarkably lowered by adding carbon black.

The effect of carbon black clearly appears at 1 wt.%, and remarkably appears at more than 3 wt.% while lumps increase with increasing the amount of carbon black. When its content exceeds 30 et.%, the lumps remarkably increases and pinholes also form. On the other hand, carbon black is effective as a light-shielding material. In this case, light-shielding a effect appears at 0.3 wt.%, clearly appears at 1 wt.%, and remarkably appears at more than 3 wt.%. As the packaging material for photosensitive materials, moistureproofness, flatness, strength of film surface, heat sealability and contamination of a photosensitive article or material are also problems. Accordingly, when these problems are also taken into consideration, the suitable content of carbon black is in the range of 0.1 to 15 wt.%, and the range of 1 to 7 wt.% is particularly preferable.

The lubricant improves processing aptitude and insertion of the product to be packaged. It prevents generations of static electricity during molding of the film and during packaging of photographic photosensitive products. It also prevents blocking of films and improves molding aptitude for T die extrusion or in the inflation process.

Suitable content of the lubricant is 0.01 to 1 wt.%. When the content is less than the above range, the above functions become insufficient. When the content is beyond the range, various defects appear. That is, heat sealing properties become inferior and excess lubricant adversely influences upon the photosensitive materials packaged i.e., development troubles happen. The layer becomes sticky, and dust adheres to it. In terms of the influence on photosensitive materials and improvements of the foregoing properties including slipping character, silicone lubricants, fatty acid amide lubricants and fatty acid lubricants are preferble. The silicone lubricants include dimethylpolysiloxane. The fatty acid amide lubricants have a carbon number of 10 to 50, preferably 15 to 35, and it includes an alkylene bis fatty acid amide. Examples of such a fatty acid amide are oleic acid amide, erucic acid amide and stearic acid amide. The number of carbon atoms in the fatty acids is in the same range as the above case of the fatty acid amides.

Examples of commercial lubricants suitable for the present invention include;

Silicone lubricants; "SHINETSU SILICONE" (Shinetsu Chemical Co., Ltd.), "TORAY SILICONE" (Toray Silicone Co., Ltd.)

Oleic acid amide lubricants; "ARMOSLIP-CP" (Lion Akzo Co., Ltd.), "NEWTRON" and "NEWTRON E 18" (Nippon Fine Chemical Co., Ltd.), "AMIDE-O" (Nitto Kagaku K.K.), "DIAMID O-200" and "DIAMID G-200" (Nippon Kasei Chemical Co., Ltd.)

Erucic acid amide lubricants; "ALFLOW P-10" (Nippon Oil and Fats Co., Ltd.)

Stearic acid amide lubricants; "ALFLOW S-10" (Nippon Oil and Fats Co., Ltd.), "NEWTRON 2" (Nippon Fine Chemical Co., Ltd.), "DIAMID 200" (Nippon Kasei Chemical Co., Ltd.)

Bis fatty acid amide lubricants; "DISAMIDE" (Nitto Kagaku K.K.), "DIAMID-200 BIS" (Nippon Kasei Chemical Co., Ltd.), "ARMOWAX-EBS" (Lion Akzo Co., Ltd.)

"ELECTROSTRIPPER" (Kao Corp.) which is an alkylamine lubricant is also preferable because it particularly improves slipping character and antistatic property, though it does not belong to the above classification.

One or more other thermoplastic resins may be blended with L-LDPE to the extent that its fundamental characteristics are not changed. such resins include various polyethylenes such as LDPE and medium-density polyethylene (MDPE) resin, various polypropylene resins, ethylene-vinyl acetate copolymer (EVA), ethylene-ethyl acrylate copolymer (EEA), ethylene-methacrylate copolymer (EMA), and ethylene-acrylic acid copolymer (EAA). In any event, L-LDPE resin content is more than 50 wt.%.

The light-reflective light-shielding thermoplastic resin layer contains a thermoplastic resin and a light-reflective material.

Fundamentally, any thermoplastic resin may be utilized, but a polyolefin resin is suitable because of large adhesive force (delamination resistance) to the light-absorptive light-shielding thermoplastic resin layer and less curling. In this regard, it is preferable that the thermoplastic resin contains more than 5 wt.% particularly more than 50 wt.% of L-LDPE resin. By blending more than 50 wt.% of L-LDPE resin, physical strength and homogeneous blending of a light-reflective material are also improved. When the thermoplastic resin composition is consistent with the light-absorptive light-shielding thermoplastic resin layer except additives, physical strength, discrimination of right side-reverse side under a safe light, printability and prevention of temperature elevation at the inside of package under sunlight are excellent. The melting point of the light-reflective light-shielding thermoplastic resin layer is preferably not lower than the light-absorptive light-shielding thermoplastic resin layer.

The light-reflective material improves light-reflection, heat resistance and discrimination of right side-reverse side under a safe light, and its color is white (including gray), yellow or silver. White (including gray) light-reflective material includes titanium oxide, zince white, barium sulfate, magnesium silicate, calcium sulfate, calcium carbonate, clay and mica. Yellow light-reflective material includes titanium yellow, chrome yellow, cadmium yellow, Oil Yellow, Chromophthal Yellow GR, quinophthalone pigments and Benzidine Yellow pigments. Silver light-reflective material includes aluminum powder, aluminum paste and synethtic pearl material. Two or more light-reflective materials may be blended. Other coloring material such as red, green or gold may also be blended within the extent capable of discriminating from the light-absorptive layer. Preferable light-reflective materials are white light-reflective materials and silver light-reflective materials. In order to improve processing aptitude, a lubricant, an antistatic agent, etc. may be added. Suitable content of the light-reflective material is different according to its kind etc., and usually in the range of 0.1 to 15 wt.%.

Various additives in addition to the additives mentioned previously may be added to one or both of the above layers. Examples of the additives are described below.

(1) Plasticizer;
phthalic acid esters, glycol esters, fatty acid esters, phosphoric acid esters, etc.

(2) Stabilizer;
lead compounds, cadmium compounds, zinc compounds, alkaline earth metal compounds, organic tin compounds, etc.

(3) Antistatic agent;
cation surfactants, anion surfactants, nonion surfactants, ampholytic surfactants, etc.

(4) Flame retardant;

phosphoric acid esters, phosphoric acid ester halides, halides, inorganic materials, polyols containing phosphor, etc.

(5) Filler;
alumina, kaolin, clay, calcium carbonate, mica, talc, titanium oxide, silica, etc.

(6) Reinforcing agent;
glass lobing, metallic fiber, glass fiber, glass milled fiber, carbon fiber, etc.

(7) Coloring agent;
inorganic pigments (Al, $Fe_2O_3$, $TiO_2$, ZnO, CdS, etc.), organic pigments, dyes, etc.

(8) Blowing agent;
inorganic blowing agents (ammonium carbonate, sodium hydrogen carbonate), organic blowing agents (nitroso compounds, azo compounds), etc.

(9) Vulcanizing agent;
vulcanization accelerator, acceleration assistant, etc.

(10) Deterioration preventing agent;
ultraviolet absorber, antioxidant, metal deactivator, peroxide decomposing agent, etc.

(11) Coupling agent;
silane compounds, titanium compounds, chromium compounds, aluminum compounds, etc.

(12) Various thermoplastic resins, rubbers

The simultaneously coextruded multilayer film layer may consist of two or more layers. Either way, the light-absorptive light-shielding thermoplastic resin layer should be located as the inner layer, that is the closest layer to the photographic photosensitive materials, and the light-reflective light-shielding thermoplastic resin layer should be located as the other layer, that is the farthest layer from the photographic photosensitive materials. When the adhesive force between the above light-absorptive layer and the above light-reflective layer is not sufficient, an intermediate layer is preferably provided in order to improve the adhesive force.

The most practically effective and inexpensive combination is that both of the inner layer and the outer layer contain more than 50 wt.% of polyolefin resin and the outer layer is more heat-resistant than the inner layer. For example, the outer layer of a simultaneously coextruded double layer film contains more than 50 wt.% of a medium of low-pressure medium- or light-density polyethylene, L-LDPE having a density of greater than 0.930 g/cm³ or polypropylene and a white light-reflective material such as titanium oxide, calcium carbonate, clay or mica or a metal powder such as aluminum powder or aluminum paste. And, the inner layer contains more than 50 wt.% of L-LDPE having a density of less than 0.930 g/cm³, carbon black preferably oil furnace carbon black and a lubricant preferably a fatty acid amide lubricant or an alkylamine lubricant.

In the case of a simultaneously coextruded triple layer film, a thermoplastic resin other than a polyolefin resin may also be utilized for the outer layer. Such a thermoplastic resin is preferably superior in heat resistance, moldability and physical strength, and for example, polyamide resins, polyester resins and polycarbonate resins are preferable. The thermoplastic resin having a good adhesive properties and usable as the intermediate layer includes ionomer resins, EVA resin, EEA resin, EMA resin and EAA resins.

The packaging material of the invention may be composed of the simultaneously coextruded multilayer film layer along. This packaging material is preferable in cost and processing aptitude.

On the other hand, one or more flexible sheet layers may be laminated to the coextruded film. The flexible sheet capable of laminating to the coextruded film includes various thermoplastic resin films which may be unstretched, uniaxially stretched or biaxially stretched such as various polyethylene films, ethylene copolymer films, polypropylene films, polyvinyl chloride films, polyvinylidene chloride films, polyamide films, polycarbonate films, fluorocarbon polymer films, polyester films and their modified resin films. Various flexible sheets such as a metallized film such as aluminum-metallized film, cellulose acetate film, cellophane, polyvinyl alcohol film, paper, metal foil such as aluminum foil, non-woven fabric, cross laminated porous fabric, foamed polyethylene sheet, foamed polypropylene sheet, foamed polystyrene sheet and foamed polyurethane sheet are also suitable.

When the packaging material is a composite film, the light-absorptive light-shielding thermoplastic resin layer of the coextruded film should be located as the inner face layer to touch a photosensitive article or material.

Flexible sheet layers may be laminated according to any known method such as a heat sealing (hot bar sealing, impulse heat sealing, supersonic welding, etc.), the method using an adhesive (wet laminating, dry laminating, hot melt laminating, extrusion laminating, etc.) and coextrusion method.

Representative adhesives are thermoplastic resin melting adhesives including polyolefin adhesives, hot melting type gum adhesives and solution type adhesives. The polyolefin adhesives include homopolymers and copolymers of olefins such as various polyethylenes, polypropylenes, polybutenes and ethylene-propylene copolymers and L-LDPE, copolymers of an olefin and another monomer such as ethylene-vinyl acetate copolymer, ethylene-ethyl acrylate copolymer, ethylene-acrylic acid copolymer, various ionomers ("SURLYN" Dupont, "Himiran" Mitsui Polychemicals Co., Ltd., etc.) and graft copolymers. The solution type adhesives are divided into adhesives for wet lamination and adhesives for dry lamination. The adhesives for wet lamination are emulsion or latex. Examples of the emulsion-type adhesives are polyvinyl acetate emulsion, the emulsion of vinyl acetate-ethylene copolymer, the emulsion of vinyl acetate-acrylate ester copolymer, the emulsion of vinyl acetate-maleate ester copolymer, the emulsion of acrylic copolymer and the emulsion of ethylene-acrylic acid copolymer. Examples of the latex-type adhesives are natural rubber latex, styrene-butadiene rubber latex, acrylonitrilebutadiene rubber latex and chloroprene rubber latex. An example of the adhesives for dry lamination is polyurethane adhesive. Adhesives for hot melt lamination where paraffin wax, microcrystalline wax, ethylene-vinyl acetate copolymer ethylene-ethylacrylate copolymer and etc. are blended, pressure-sensitive adhesives and temperature-sensitive adhesives may also be employed. The melting point of the adhesive employed is preferably lower than 5° C. from the melting point of the layers to be joined in order to laminate without adverse influence upon the layer to be coated by a thermal melting adhesion.

The thickness of the adhesive layer formed by extrusion laminating using a thermoplastic resin is usually 7 to 100 μm, preferably ;b 15 to 50 μm.

The packaging material of the invention is suitable for packaging silver halide photographic photosensitive materials, diazo photographic photosensitive materials, photosensitive resins, self-developing type photographic materials and diffusion-transfer type photographic materials, etc. This packaging material is also usable for packaging foods such as chocolate, margarine, miso, wine and beer, medicines, dyes and other chemical materials such as developing solution and mordants for dying and the like. This packaging material is particularly suitable for the moistureproof light-shielding double sheet bag for photographic photosensitive materials of which quality is degraded by a small amount of a gas, light or moisture.

The package form may be conventional, and includes a single-sheet flag bag, a double-sheet flat bag, a square bottom bag, a self-standing bag, a single-sheet gusset bag, a double-sheet gusset bag, a film sheet, an inner lining for a moistureproof box and a leader paper. The above bags may be triple-sheet bags or more.

The sealing form may also be conventional, and includes heat sealing, impulse heat sealing, supersonic welding and high frequency sealing. The methods of using an adhesive and a pressure sensitive adhesive may also be utilized.

The packaging material of the invention is superior in tear strength, impact puncture strength, light-shielding, prevention of temperature elevation at the inside of package under sunlight, moistureproofness, heat resistance, discrimination of right side-reverse side under a safe light, slipping character, heat sealing properties and printability. This packaging material can be made thin and its cost is lowered.

Representative embodiments of the packaging materials of the invention are illustrated in FIGS. 1 to 10.

Figure 1:
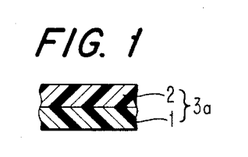
FIGS. 1 to 10 are sectional views of preferred embodiments of the invention.

The packaging material of FIG. 1 is the most fundamental packaging material of the invention which is a simultaneously coextruded double layer film layer 3a consisting of the inner layer of a light-absorptive light-shielding thermoplastic resin layer 1 containing carbon black and a lubricant and the outer layer of a light-reflective light-shielding thermoplastic resin layer 2 containing a light-reflective material.

Figure 2:
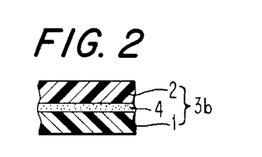

The packaging material of FIG. 2 is a simultaneously coextruded triple layer film layer 3b consisting of the inner layer of a light-absorptive light-shielding thermoplastic resin layer 1, an intermediate layer 4 having a good adhesive properties and an outer layer of a light-reflective light-shielding thermoplastic resin layer.

Figure 3:
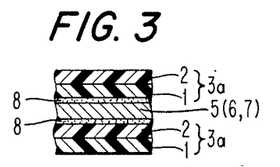

The packaging material of FIG. 3 consists of a flexible sheet layer 5 (or a metal foil layer 6 or a metallized flexible sheet layer 7) and two coextruded double layer film layers 3a of FIG. 1 laminated on both sides of the flexible sheet layer 5 so that each light-absorptive light-shielding thermoplastic resin layer 1 is located on the side of packaging materials. Each coextruded double layer film layer 3a is laminated through an adhesive layer 8.

Figure 4:
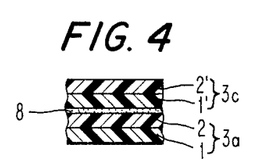

The packaging material of FIG. 4 consists of the coextruded double layer film layer 3a and a simultaneously coextruded double layer film layer 3c consisting of a light-absorptive light-shielding thermoplastic resin layer 1' and a light-reflective light-shielding thermoplastic resin layer 2' laminated on each other through an adhesive layer 8. Compositions of the light-absorptive resin layer 1' and the light-reflective resin layer 2' are different from the corresponding layers 1, 2 of the coextruded double layer film layer 3a. Each light-absorptive resin layer 1, 1' is located on the side of packaging materials.

Figure 5:
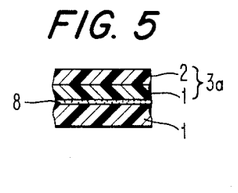

The packaging material of FIG. 5 consists of a light-absorptive light-shielding thermoplastic resin layer 1 and the coextruded double layer film layer 3a of FIG. 1 laminated thereon through an adhesive layer 8.

Figure 6:
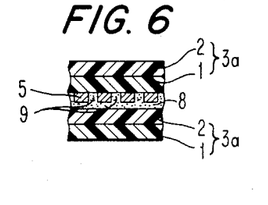

The packaging material of FIG. 6 consists of a perforated flexible sheet layer 5 and two coextruded double layer film layers 3a, 3a laminated on both sides through an adhesive layer 8. The adhesive penetrates holes of the flexible sheet layer 5, and it joins the above two coextruded layers 3a, 3a.

Figure 7:
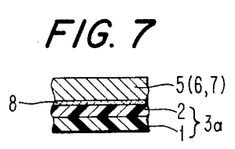

The packaging material of FIG. 7 consists of the coextruded double layer film layer 3a of FIG. 1 and a flexible sheet layer 5 laminated thereon through an adhesive layer 8.

Figure 8:
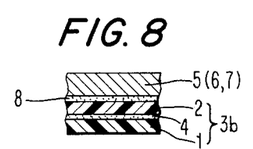

The packaging material of FIG. 8 consists of the coextruded triple layer film layer 3b of FIG. 2 and a flexible sheet layer 5 laminated thereon through an adhesive layer 8.

Figure 9:
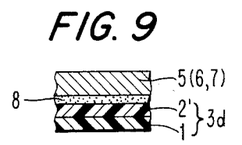

The packaging material of FIG. 9 is the same as the packaging material of FIG. 7 except that resin composition of the light-reflective light-shielding thermoplastic resin layer 2' is different.

Figure 10:
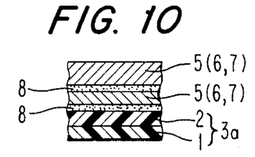

The packaging material of FIG. 10 consists of the coextruded double layer film layer 3a of FIG. 1 and two flexible sheet layers 5, 5 laminated thereon each through an adhesive layer 8.

In FIGS. 7 to 10, each flexible sheet layer 5 is preferably a transparent flexible sheet such as a transparent biaxially stretched thermoplastic resin film or cellophane, a light-reflective flexible sheet such as a metal foil or a metallized flexible sheet or a paper.

Figure 11:
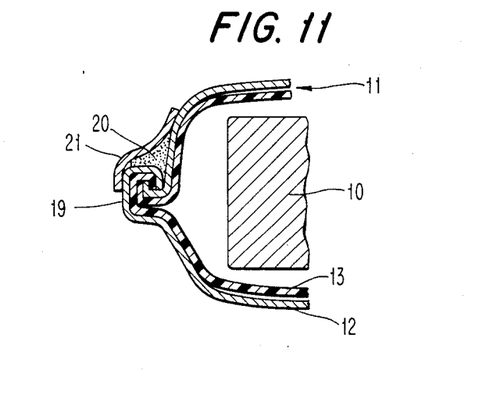
FIG. 11 is a sectional view of a double-sheet gusset bag packaging a roll of photographic color printing paper in a longitudinal direction.
Figure 12:
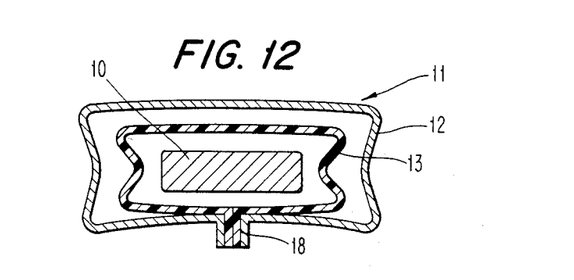

FIGS. 11 and 12 illustrate a roll of color photographic printing paper packaged by a double-sheet gusset bag made by using the packaging materials of the invention. FIG. 11 is a partially sectional side view thereof in the longitudinal direction, and FIG. 12 is also a sectional side view thereof in the lateral direction. This bag 11 consists of an outer sheet 12 and an inner sheet 13. The packaging material of the invention such as exemplified in FIGS. 1 to 6 may be used as the inner sheet 13. On the other hand, as the outer sheet, the packaging material of FIGS. 7 to 10 or 13 to 16 may be used. The inner sheet 13 and the outer sheet 12 were sealed at a center sealing of its longitudinal direction (not shown in the drawing) and an edge sealing position 19 by heat sealing. The edge was tacked and joined by an adhesive 20. A tape 21 was further attached to form a seal.

Figure 13:
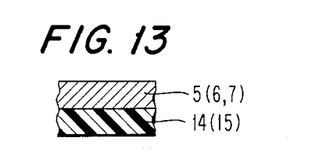
FIGS. 13 to 16 are sectional views showing examples usable as the outer sheet of the above gusset bag.

The laminated film of FIG. 13 consists of a flexible sheet layer 5 and a LDPE film layer 14 or a L-LDPE film layer 15 directly coated on it as a heat sealing layer.

Figure 14:
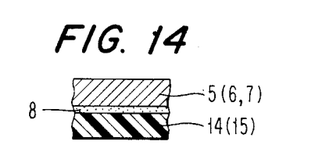

The laminated film of FIG. 14 consists of a flexible sheet layer 5 and LDPE film layer 14 or a L-LDPE film layer 15 separately molded and laminated thereon through an adhesive layer 8.

Figure 15:
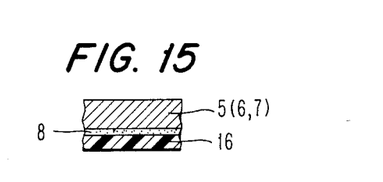

The laminated film of FIG. 15 consists of a flexible sheet layer 5 and a light-shielding L-LDPE film layer 16 separately molded and laminated thereon through an adhesive layer 8.

Figure 16:
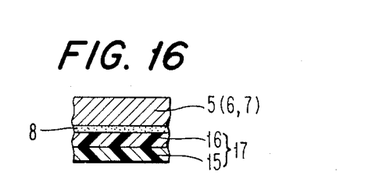

The laminated film of FIG. 16 consists of a flexible sheet layer 5 and a simultaneously coextruded double layer 17 consisting of a L-LDPE film layer 15 and a light-shielding L-LDPE film layer 16 laminated thereon through an adhesive layer 8.

EXAMPLES

The packaging material of Example 1 corresponds to the embodiment illustrated in FIG. 1. The inner layer was the light-absorptive light-shielding thermoplastic resin layer 1 being 60 μm thick and composed of 92.45 wt.% of L-LDPE resin ("ULTZEX #2021L", α-olefin; 4-methylpentene-1, Density; 0.920 g/cm³, Mitsui Petrochemical Industries Co., Ltd.), 3 wt. % of oil furnace carbon black, 0.05 wt.% of oleic acid amide lubricant ("ARMOSLIP-CP", Lion Akzo Co., Ltd.) and 4.5 wt.% of LDPE resin. The outer layer was the light-reflective light-shielding thermoplastic resin layer 2 being 30 μm thick and composed of 90.5 wt.% of L-LDPE resin ("ULTZES #3520L", α-olefin; 4-methylpentene-1, Density; 0.935 g/cm³, Mitsui Petrochemical Industries Co., Ltd.), 5 wt.% of titanium oxide and 4.5 wt.% of LDPE resin. This simultaneously coextruded double layer film layer 3a being 90 μm thick was formed by inflation molding.

The packaging material of Example 2 corresponds to the embodiment illustrated in FIG. 1. The inner layer was the light-absorptive light-shielding thermoplastic resin layer 1 being 60 μm thick and composed of 92.45 wt.% of L-LDPE resin ("STAMILEX #1046", α-olefin; octene-1, Density; 0.920 g/cm³, Idemitsu Petrochemical Co., Ltd.), 3 wt.% of oil furnace carbon black, 0.10 wt.% of oleic acid amide lubricant ("ARMOSLIP-CP", Lion Akzo Co., Ltd.) and 4.5 wt.% of EEA resin ("DPDJ-6170", Nippon Unicar Co., Ltd.). The outer layer was the light-reflective light-shielding thermoplastic resin layer being 30 μm thick and composed of 90.5 wt.% of high-density polyethylene (HDPE) resin ("HIZEX #3300", Mitsui Petrochemical Industries Co., Ltd.), 5 wt.% of titanium oxide and 4.5 wt.% of LDPE resin. This simultaneously coextruded double layer film layer 3a was formed by inflation molding.

The packaging material of Example 3 corresponds to the embodiment illustrated in FIG. 7. The flexible sheet layer 5 was a vacuum metallized biaxially stretched polypropylene film being 20 μm thick and having 400 Å in thickness of an aluminum membrane, and laminated on the outer layer of the packaging material of Example 1 though a LDPE resin adhesive layer 8 being 13 μm thick.

Comparative packaging material 1 corresponds to FIG. 17. This packaging material was a single layer film of a light-shielding L-LDPE resin layer 16 consisting of 92.45 wt.% of L-LDPE resin ("STAMILEX #114L", α-olefin; butene-1, Density; 0.920 g/cm³, Idemitsu Petrochemical Co., Ltd.), 3 wt.% of oil furnace carbon black, 0.05 wt.% of oleic acid amide lubricant ("ARMOSLIP-CP", Lion Akzo Co., Ltd.) and 4.5 wt.% of LDPE resin. Thickness of this film was 90 μm, and it was formed by inflation molding.

Conventional packaging material 1 corresponds to FIG. 17. This packaging materials was a single layer film of a light-shielding LDPE resin layer 22 being 90 μm thick and containing 3 wt.% of oil furnace carbon black.

Conventional packaging material 2 corresponds to FIG. 18. This packaging material was composed of a light-shielding LDPE resin layer 22 being 50 μm thick and containing 3 wt.% of carbon black and 0.05 wt.% of oleic acid amide lubricant, aluminum foil layer 6 being 7 μm thick laminated thereon through a LDPE resin extrusion adhesive ;ayer 8 being 15 μm thick and a flexible sheet layer 5 of LDPE resin being 50 μm thick further laminated thereon through a LDPE resin extrusion adhesive layer 8 being 15 μm thick.

Conventional packaging material 3 corresponds to FIG. 19. This packaging material was composed of the laminate of the conventional packaging materials 2, 35 g/cm² of bleached kraft paper laminated thereon through an adhesive layer 8 and a light-shielding LDPE resin layer 22 being 50 μm thick further thereon through a LDPE resin extrusion adhesive layer 8 being 15 μm thick.

The constitution of the above packaging materials are tabulated in Table 1, and their properties are tabulated in Table 2.

In the packaging materials, the following materials are employed;
LDPE layer:
"DFD-0111" (Nippon Unicar Co., Ltd.)
MI: 2.4 g/10 minutes
Density: 0.923 g/cm³
LDPE adhesive layer:
"MIRASON 14"
(Mitsui Polychemicals Co., Ltd.)
MI: 5.1 g/10 minutes
Density: 0.919 g/cm³
Carbon black:
"#44B Oil furnace carbo black"
(Mitsubishi Chemical Industries Ltd.)
Mean particle size: 21 mμ, pH: 7.7

TABLE 1-1

|  | Unit | Invention | | |
|---|---|---|---|---|
|  |  | I | II | III |
| Inner Layer | | | | |
| Content of L-LDPE Resin | wt. % | 92.45 | 92.45 | 92.45 |
| (Brand) |  | ULTZEX #2021L | STAMILEX #1046 | ULTZEX #2021L |
| Content of Carbon Black | " | 3.0 | 3.0 | 3.0 |
| Content of Lubricant | " | 0.05 | 0.10 | 0.05 |
| (Brand) |  | ARMOSLIP-CP | ARMOSLIP-CP | ARMOSLIP-CP |
| Other Resin | " | LDPE | EEA | LDPE |
| Content |  | 4.5 | 4.5 | 4.5 |
| Outer Layer | | | | |
| Content of Thermoplastic Resin | " | 90.5 | 90.5 | 400Å Aluminum Metallized Biaxially Stretched Polypropylene Film |
| (Brand) |  | ULTZEX #3520L | HIZEX #3300 |  |
| Light-Reflective Material |  | TiO₂ | TiO₂ |  |
| Content | " | 5.0 | 5.0 |  |

TABLE 1-1-continued

|  | Unit | Invention I | Invention II | Invention III |
|---|---|---|---|---|
| Other Resin | " | LDPE | LDPE |  |
| Content |  | 4.5 | 4.5 |  |
| Layer Constitution |  | FIG. 1 | FIG. 1 | FIG. 7 |
| Number of Layers |  | 2 | 2 | 4 |
| Layer Thickness |  |  |  |  |
| Total | μm | 90 | 90 | 110 |
| Inner Layer | " | 60 | 60 | 60 (30) |
| Outer Layer | " | 30 | 30 | 20 |

TABLE 1-2

|  | Unit | Comparative I | Conventional I | Conventional II | Conventional III |
|---|---|---|---|---|---|
| Inner Layer |  |  |  |  |  |
| Content of L-LDPE Resin | wt. % | 92.5 | 0 | 0 | 0 |
| (Brand) |  | IDEMITSU POLYETHYLENE #114L | — | — | — |
| Content of Carbon Black | " | 3.0 | 3.0 | 3.0 | 3.0 |
| Content of Lubricant | " | 0.05 | 0 | 0.05 | 0.05 |
| (Brand) |  | — | — | ARMOSLIP-CP | ARMOSLIP-CP |
| Other Resin | " | LDPE | LDPE | LDPE | LDPE |
| Content |  | 4.5 | 97.0 | 96.95 | 96.95 |
| Outer Layer |  |  |  |  |  |
| Content of Thermoplastic Resin |  |  |  |  |  |
| (Brand) |  |  |  | Equal to Inner Layer | Equal to Inner Layer |
| Light-Reflective Material Content |  |  |  |  |  |
| Other Resin Content |  |  |  |  |  |
| Layer Constitution |  | FIG. 17 | FIG. 17 | FIG. 18 | FIG. 19 |
| Number of Layers |  | 1 | 1 | 5 | 7 |
| Layer Thickness |  |  |  |  |  |
| Total | μm | 90 | 90 | 137 | 195 |
| Inner Layer | " | 90 | 90 | 50 | 50 |
| Outer Layer | " |  |  | 50 | 50 |

TABLE 2-1

|  | Unit | Invention I | Invention II | Invention III | Testing Method |
|---|---|---|---|---|---|
| Tear Strength (MD) | g | 1213 | 1393 | 1600< | JIS P 8116 |
| Tear Strength (CD) | " | 1600< | 1600< | 1600< | " |
| Blocking between Photosensitive Materials |  | Not Occurred | Not Occurred | Not Occurred | 35° C. 80% After One Day |
| Impact Puncture |  |  |  |  |  |
| Strength (Right) |  | 19.1 | 18.3 | 24.5 | JIS P 813 |
| Strength (Reverse) |  | 20.1 | 18.3 | 23.6 | " |
| Printability |  | B | B | B |  |
| Slip Angle (Outer Layer) |  | 11.3 | 10.7 | 34.8 | A |
| Slip Angle (Inner Layer) |  | 11.1 | 10.3 | 11.2 | " |
| Light-Shielding |  | B | B | A | B |
| Hot Seal Ability |  | A | A | A | C |
| Gelbo Test Strength |  | A | A | A | D |
| Discrimination of Right-Reverse under Safe Light |  | A | A | A |  |
| Heat Sealing Properties |  | A | A | A |  |
| Change of Heat Seal Strength with Time Passage |  | A | A | A | Tested under Actual Conditions |
| Heat Resistance After |  | A | A | A |  |

TABLE 2-1-continued

| | Unit | Invention | | | Testing Method |
|---|---|---|---|---|---|
| | | I | II | III | |
| 2 Hours under 80000 Luxes Sunlight | | | | | |

TABLE 2-2

| | Unit | Comparative I | Conventional | | | Testing Method |
|---|---|---|---|---|---|---|
| | | | I | II | III | |
| Tear Strength (MD) | g | 384 | 163 | 189 | 294 | JIS P 8116 |
| Tear Strength (CD) | " | 863 | 429 | 347 | 610 | " |
| Blocking between Photo-sensitive Materials | | Occasionally | Occasionally | Rare | Rare | 35° C. 80% After One Day |
| Impact Puncture | | | | | | |
| Strength (Right) | | 11.6 | 9.8 | 3.3 | 5.1 | JIS P 813 |
| Strength (Reverse) | | 12.4 | 10.7 | 4.6 | 5.8 | " |
| Printability | | (Except White) | (Except White) | (Except White) | (Except White) | |
| Slip Angle (Outer Layer) | | Right 31.8 | 35.1 | <20.8 | 20.3 | A |
| Slip Angle (Inner Layer) | | Reverse 33.2 | 37.3 | 20.4 | 19.6 | " |
| Light-Shielding | | B | B | B | A | B |
| Hot Seal Ability | | A | D | D | D | C |
| Gelbo Test Strength | | A | B | C | C | D |
| Discrimination of Right-Reverse under Safe Light | | E | E | E | E | |
| Heat Sealing Properties | | B | C | C | C | Tested under Actual Conditions |
| Change of Heat Seal Strength with Time Passage | | A | D | D | D | |
| Heat Resistance After 2 Hours under 80000 Luxes Sunlight | | E | E | D | D | |

Evaluations in Table 2 was carried out as follows:
A very excellent
B excellent
C practical
D having a problem
E impractical
Testing methods were as follows:
Density: JIS K 6760 (=ASTM D-1505)
Melt Index: JIS D 6760 (=ASTM D-1238)
Thickness: JIS P 8118
Tear Strength: JIS P 8116
Impact Puncture Strength: JIS P 8134
Angle of Slip:
  A part of the sample was cut off, and stuck on the underside of 75 mm length×35 mm width of a block weighing 200 g. Another part of the sample was stuck on an inclined face, and the above block was placed on the face. The inclined angle was increased, and the angle where the block began to slip was read.
Light-Shielding Character:
  A photographic film of ASA 100 was put into the bag made by each exemplified film, and then the bag was completely sealed. This bag was exposed to the light of 80,000 luxes for one hour, and the light-shielding character was estimated by the fogging degree of the photographic film.
Hot Tack Properties (Hot-Seal Ability):
  Two sheets of each exemplified film having 15 mm in width were sealed by heat sealing at 160° C., and just after, the open ends were pulled by the weight of 45 g at the releasing angle of 22.5 degree. This character was estimated by the released length (cm).
Gelbo Test Strength:
  Estimated by the number of bendings until the sample lost its light-shielding property due to the occurrence of pin holes. The testing machine according to U.S. Military Standard-MIL-B 131 was employed. The larger number expresses the larger strength.
  A 101 times or more
  B 51-100 times
  C 7-50 times
  D 3-7 times
  E 2 times or less

I claim:

1. A packaging material for photographic photosensitive materials which comprises a simultaneously coextruded multilayer film layer comprising a light-absorptive light-shielding thermoplastic resin layer containing more than 50 wt.% based on the resin content of layer of low-pressure linear low-density polyethylene resin, 0.1 to 15 wt.% of carbon black and 0.01 to 1 wt.% of a lubricant and being located as the inner layer and a light-reflective light-shielding thermoplastic resin layer containing a thermoplastic resin and a light-reflective material being located as the outer layer.

2. The packaging material of claim 1 wherein α-olefin of said low-pressure linear low-density polyethylene is 4-methylpentene-1, hexene-1 or octene-1.

3. The packaging material of claim 1 wherein said lubricant is a silicone lubricant, a fatty acid amide lubricant, a fatty acid lubricant or an alkylamine lubricant.

4. The packaging material of claim 1 wherein said light-absorptive light-shielding thermoplastic resin layer contains one or more thermoplastic resins selected from the group consisting of high-pressure low-density polyethylene resin, medium-density polyethylene resin, polypropylene resins, ethylene-vinyl acetate copolymer, ethylene-ethyl acrylate copolymer, ethylene-methacrylate copolymer and ethylene-acrylic acid copolymer in addition to more than 50 wt.% of said low-pressure linear low-density polyethylene resin.

5. The packaging material of claim 1 wherein said thermoplastic resin is a polyolefin resin.

6. The packaging material of claim 1 wherein said thermoplastic resin contains more than 50 wt.% of low-pressure linear low-density polyethylene.

7. The packaging material of claim 1 wherein melting point of said light-reflective light-shielding thermoplastic resin layer is not lower than the melting point of said light-absorptive light-shielding thermoplastic resin layer.

8. The packaging material of claim 1 wherein the color of said light-reflective material is white, gray, yellow or silver.

9. The packaging material of claim 8 wherein said light-reflective material is a member selected from the group consisting of titanium oxide, zinc white, barium sulfate, magnesium silicate, calcium sulfate, calcium carbonate, clay, mica, aluminum powder, aluminum paste and synthetic pearl material.

10. The packaging material of claim 1 wherein the carbon black is present in an amount ranging from 1 to 15 wt.%.

11. The packaging material of claim 1 wherein the carbon black is present in an amount ranging from 3 to 12 wt.%.

* * * * *